(12) United States Patent
Wada et al.

(10) Patent No.: US 7,959,298 B2
(45) Date of Patent: Jun. 14, 2011

(54) PROJECTION TYPE DISPLAY APPARATUS

(75) Inventors: Mitsuhiro Wada, Kyoto (JP); Shinya Sannohe, Osaka (JP); Yoshimasa Fushimi, Osaka (JP)

(73) Assignee: Panasonic Corporation, Osaka (JP)

( * ) Notice: Subject to any disclaimer, the term of this patent is extended or adjusted under 35 U.S.C. 154(b) by 433 days.

(21) Appl. No.: 12/302,827

(22) PCT Filed: May 25, 2007

(86) PCT No.: PCT/JP2007/060690
§ 371 (c)(1),
(2), (4) Date: Nov. 28, 2008

(87) PCT Pub. No.: WO2007/139011
PCT Pub. Date: Dec. 6, 2007

(65) Prior Publication Data
US 2009/0244494 A1    Oct. 1, 2009

(30) Foreign Application Priority Data

May 29, 2006 (JP) .................................. 2006-148061

(51) Int. Cl.
*G03B 21/14* (2006.01)
(52) U.S. Cl. ............................... 353/31; 353/84; 353/88
(58) Field of Classification Search .................... 353/30, 353/31, 84, 88
See application file for complete search history.

(56) References Cited

U.S. PATENT DOCUMENTS

| | | | |
|---|---|---|---|
| 6,597,409 B1 | 7/2003 | Shioya et al. | |
| 6,755,554 B2 * | 6/2004 | Ohmae et al. | 362/293 |
| 7,333,074 B2 * | 2/2008 | Wada et al. | 345/32 |
| 2002/0003704 A1 * | 1/2002 | Ohmae et al. | 362/293 |
| 2003/0128000 A1 * | 7/2003 | Nakanishi | 315/408 |
| 2004/0095767 A1 * | 5/2004 | Ohmae et al. | 362/293 |

(Continued)

FOREIGN PATENT DOCUMENTS

JP    2000-227782 A    8/2000

(Continued)

*Primary Examiner* — John R Lee
(74) *Attorney, Agent, or Firm* — Hamre, Schumann, Mueller & Larson, P.C.

(57) ABSTRACT

A projection type display apparatus includes: a rotary color filter 8 having color filters 8R, 8G and 8B that transmit particular colors of light of white light emitted from a light-emitting surface 6; a spatial light modulator 11 that is disposed so as to be in substantially a conjugate relationship with the light-emitting surface, and modulates incident light from the rotary color filter, so as to display an image; and a control device 20 that controls rotation of the rotary color filter so as to be in synchronization with the image display by the spatial light modulator. With respect to partial display regions 14, 15, 16, . . . of the spatial light modulator that correspond respectively to partial light-emitting regions 6a, 6b, 6c, . . . defined by dividing the light-emitting surface, the control device switches each of the partial display regions 14, 15, 16, . . . between a normal image display state and an OFF state for cutting off light, in synchronization with passing of boundary lines 51, 52 and 53 between each pair of adjacent ones of the color filters of the rotary color filter over each of the partial light-emitting regions 6a, 6b, 6c, . . . . Thus, the efficiency of using illumination light by the spatial light modulator is improved, and it is possible to achieve an increased color luminance of a projected image, while sufficiently maintaining an effect of preventing color mixing from being caused by adjoining color filters.

11 Claims, 9 Drawing Sheets

U.S. PATENT DOCUMENTS

| | | |
|---|---|---|
| 2005/0117074 A1 | 6/2005 | De Vaan |
| 2005/0157272 A1 | 7/2005 | Childers |
| 2009/0190045 A1* | 7/2009 | Endo et al. .................... 348/760 |
| 2009/0244494 A1* | 10/2009 | Wada et al. ..................... 353/84 |
| 2010/0026726 A1* | 2/2010 | Fujii et al. ..................... 345/690 |
| 2011/0001688 A1* | 1/2011 | Wada et al. ..................... 345/32 |

FOREIGN PATENT DOCUMENTS

| | | |
|---|---|---|
| JP | 2002-131687 A | 5/2002 |
| JP | 2004-317528 A | 11/2004 |

* cited by examiner

PROJECTION TYPE DISPLAY APPARATUS

TECHNICAL FIELD

The present invention relates to a projection type display apparatus that projects a large screen video image on a screen by the use of a spatial light modulator that is illuminated with light radiated from a light source and forms an optical image based on an externally supplied video signal and a projection lens.

BACKGROUND ART

Conventionally, projection type display apparatuses using various types of spatial light modulators have been known as video equipment for use with a large screen. Such a projection type display apparatus uses, for example, a transmission type or reflection type liquid crystal panel as a spatial light modulator and has a configuration in which the liquid crystal panel is illuminated by a light source, and an optical image according to an externally supplied video signal is formed on the liquid crystal panel and is projected in a magnified state on a screen by a projection lens.

In recent years, with the need for higher luminance growing, a projection type display apparatus of a three-panel system that uses three spatial light modulators such as liquid crystal panels has become mainstream. However, such a projection type display apparatus has presented a problem of an increase in overall cost of the apparatus.

Meanwhile, a projection type display apparatus of a single-panel system has been known that uses only one liquid crystal panel so that a cost reduction is achieved. However, such a projection type display apparatus has presented a problem that color filters of three primary colors need to be provided in each pixel on a liquid crystal panel, resulting in a substantial deterioration in resolution. Further, such a display apparatus has presented another problem in that about two-thirds of illumination light is lost at the color filters, resulting in a deterioration in luminance of a screen.

With respect to the above-described problems, a projection type display apparatus of a color sequential system has been known that uses a disk-shaped color wheel (see, for example, Patent Document 1). According to this system, a single spatial light modulator is irradiated sequentially with lights of three primary colors of red, green and blue, and thus a full-color display is performed.

Figure 9:
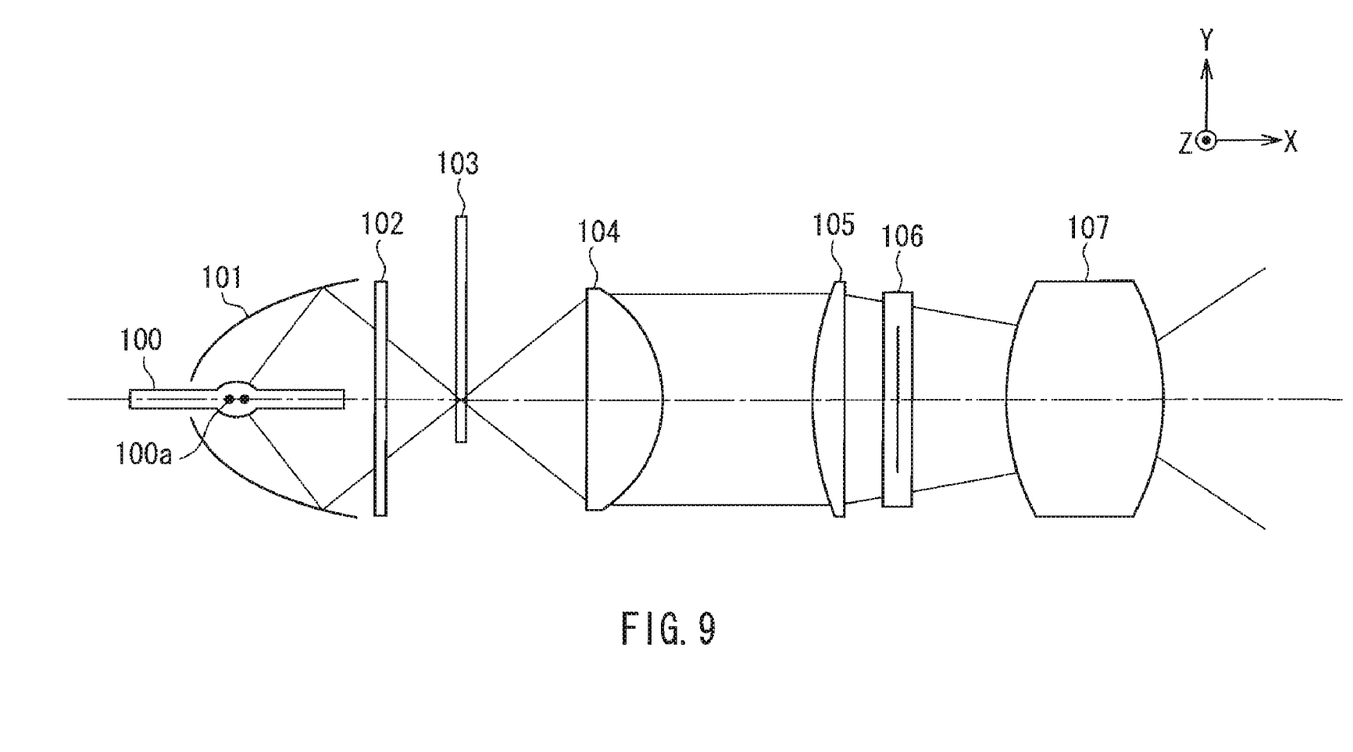
FIG. 9 is a structural view showing an example of a configuration of a conventional projection type display apparatus.

FIG. 9 is a structural view showing an example of a configuration of such a projection type display apparatus. In FIG. 9, white light radiated from a light-emitting portion of a discharge lamp 100, which is formed of a pair of electrodes 100a, is condensed by a concave mirror 101 onto a color wheel 103 via a UV-IR cut-off filter 102. The UV-IR cut-off filter 102 is used to remove ultraviolet rays and infrared rays from light radiated from the discharge lamp 100.

The color wheel 103 is formed by combining fan-shaped red, green and blue color filters into a disk shape, and when rotated, it can transmit sequentially and selectively lights with wavelengths in the respective wavelength bands of red, green and blue. Light radiated from the discharge lamp 100 passes through the color wheel 103, a condensing lens 104, and a field lens 105 and is irradiated onto a liquid crystal panel 106. The color wheel 103 is rotated in synchronization with an image display by the liquid crystal panel 106, and thus optical images corresponding respectively to red, green and blue video signals are formed on the liquid crystal panel 106 on a time-division basis.

The condensing lens 104 is used to lead light transmitted through the color wheel 103 efficiently to the liquid crystal panel 106. Further, the field lens 105 is used to condense light to be transmitted through the liquid crystal panel 106 onto a projection lens 107. The optical images on the liquid crystal panel 106 are projected in a magnified state on a screen (not shown) by the projection lens 107, thereby allowing a large screen video image to be displayed in full color.

According to this system, a color image having a resolution as high as that achieved by the three-panel system can be obtained even with the use of a single liquid crystal panel. Further, this system eliminates the need to provide minute color filters in each pixel on a liquid crystal panel, and thus a yield of a liquid crystal panel is improved, thereby allowing a cost reduction of an apparatus to be achieved.

Patent Document 1: JP 2004-317528 A

DISCLOSURE OF INVENTION

Problem to be Solved by the Invention

A projection type display apparatus as described in Patent Document 1 and shown in FIG. 9 realizes a resolution as high as that achieved by the three-panel system even with the use of a single spatial light modulator and allows cost and size reductions of the apparatus to be achieved. The above-described display apparatus, however, presents the following problem.

Figure 10:
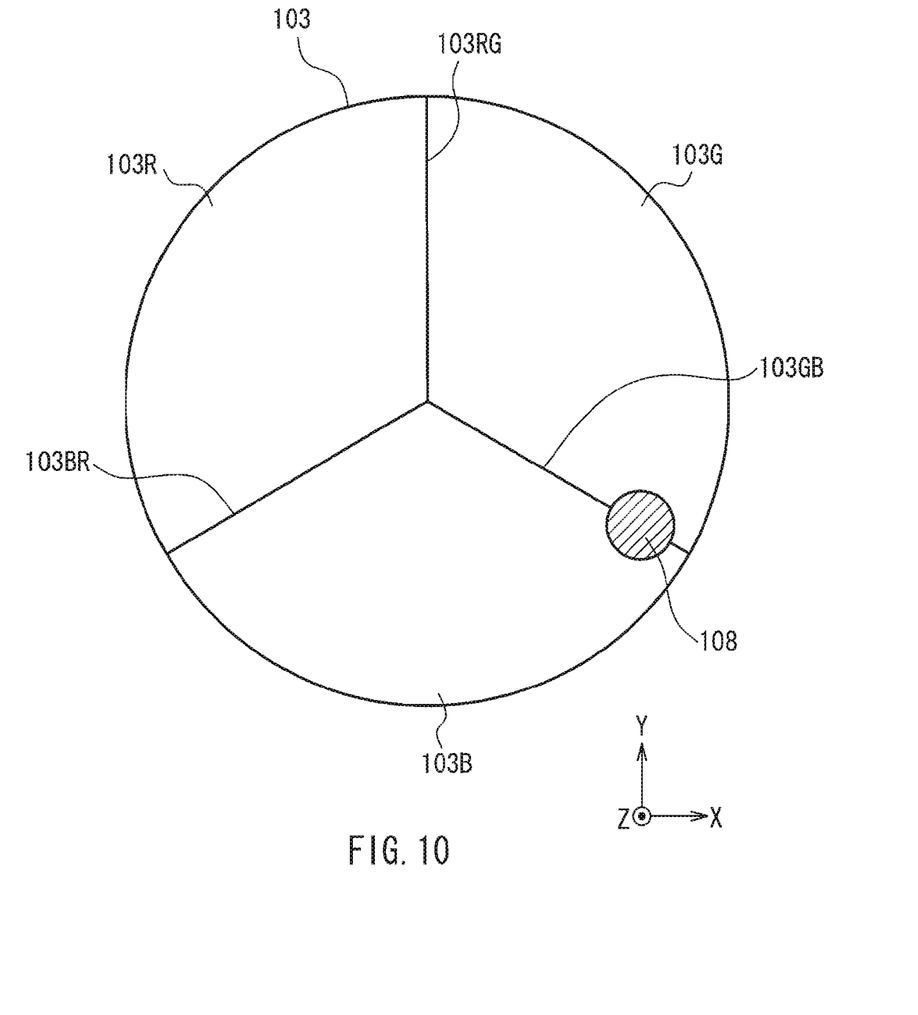
FIG. 10 is a schematic diagram schematically showing a relationship between a color wheel 103 and a condensed light spot 108.

FIG. 10 is a diagram schematically showing a relationship between the color wheel 103 and a condensed light spot 108. The condensed light spot 108 of light radiated from the discharge lamp 100 is formed on the color wheel 103. The size of the condensed light spot 108 depends on the size of the light-emitting portion 100a of the discharge lamp 100, and the larger the light-emitting portion 100a is, the larger the condensed light spot 108 will be.

The color wheel 103 is composed of, for example, fan-shaped red, green and blue color filters 103R, 103G and 103B combined into a disk shape. Boundaries 103RG, 103GB and 103BR are present between the color filters 103R and 103G, between the color filters 103G and 103B, and between the color filters 103B and 103R, respectively. This color wheel 103 is rotated in synchronization with a display by the liquid crystal panel 106, and thus a full-color display can be performed. However, in a state where the condensed light spot 108 falls at a position bridging adjacent color filters, a problem arises that color mixing occurs and causes an image to be displayed in an unintended color.

In practice, as a solution to the above-described problem of color mixing, during a time period in which each of the boundaries 103RG, 103GB and 103BR between each pair of adjacent ones of the color filters passes the condensed light spot 108, the liquid crystal panel 106 is brought to a black display state, i.e. an OFF state. Hereinafter, each zone on the color filter 103 that corresponds to this time period is referred to as a black display zone.

However, it is known that in a light source used in a projection type display apparatus such as the discharge lamp 100, the size of the light-emitting portion 100a (hereinafter, referred to as an arc length) changes during the use of the light source, and in general, the arc length tends to increase with increasing lighting time. This leads to a problem that the condensed light spot 108 gradually increases in size during the service life, so that a black display zone that has been set originally becomes no longer effective in preventing the occurrence of color mixing, thus causing an image to be displayed in an unintended color.

With respect to this problem, a measure could be taken in which, in view of a change in arc length during a lamp service life, a black display zone is set based on a condensed light spot that is assumed beforehand to be somewhat larger than its actual size. However, as the size of the black display zone is increased, the percentage of light that contributes to a display decreases. This means that, at an early stage of the service life when the arc length is relatively short, a black display zone that has been set is undesirably oversized, resulting in decreased efficiency and a deterioration in luminance of a projected image.

With the foregoing in mind, it is an object of the present invention to provide a projection type display apparatus that can achieve an increased color luminance of a projected image, while sufficiently maintaining an effect of suppressing color mixing.

Means for Solving Problem

A projection type display apparatus according to the present invention includes: a light source that radiates white light; light-emitting-surface-forming optical elements that condense light emitted from the light source so as to form a light-emitting surface; a rotary color filter that is disposed in a vicinity of the light-emitting surface and has plural types of color filters for selectively transmitting or reflecting, in a predetermined order, particular colors of light of white light emitted from the light-emitting surface; a spatial light modulator that is disposed so as to be in substantially a conjugate relationship with the light-emitting surface, and modulates incident light in accordance with a video signal, so as to display an image; an illumination optical element that condenses light emitted from the rotary color filter to form illumination light for illuminating the spatial light modulator; a projection lens that projects an image formed by the spatial light modulator; and a control device that controls rotation of the rotary color filter so as to be in synchronization with the image display by the spatial light modulator.

In order to solve the above-described problems, the control device is characterized by performing divisional driving for switching a state of displaying an image with respect to each of a plurality of partial display regions of the spatial light modulator that correspond respectively to a plurality of partial light-emitting regions defined by dividing the light-emitting surface in a rotation direction of the rotary color filter, so that each of the partial display regions is switched between a normal image display state and an OFF state for cutting off light, in synchronization with passing of a boundary line between each pair of adjacent ones of the color filters of the rotary color filter over each of the partial light-emitting regions.

EFFECTS OF THE INVENTION

According to a projection type display apparatus having the above-described configuration, the control of an OFF state is performed with respect to each of partial display regions. Thus, compared with the case where an OFF state of an entire display surface of a spatial light modulator is controlled at the same time, the efficiency of using illumination light is improved, and it is possible to achieve an increased color luminance of a projected image, while sufficiently maintaining the effect of preventing color mixing from being caused by adjoining color filters.

EXPLANATION OF LETTERS OR NUMERALS 3 light source
5 glass rod
6, 62 light-emitting surface
6a, 6b, 6c, 71a, 72a, 73a, 74a, 75a partial light-emitting region
7 light-blocking plate
8 rotary color filter
8R, 8G, 8B color filter
9 relay lens
11, 63 liquid crystal panel
11a, 63a display surface
12 projection lens
13 optical axis
14, 15, 16, 71b, 72b, 73b, 74b, 75b partial display region
20 control device
21 photosensor
51, 52, 53 boundary line

DESCRIPTION OF THE INVENTION

Having the above-described configuration as a basic configuration, the present invention can be embodied in various forms as described below.

That is, preferably, the partial light-emitting regions are set so as to have a dimension that satisfies an expression below:

θmax≦8 deg where θmax is defined as a maximum angle that subtends each of the partial light-emitting regions from a rotation center of the rotary color filter.

Furthermore, preferably, the partial light-emitting regions are set so as to have a dimension that satisfies an expression below:

θmax/θmin≦5 where θmax is defined as a maximum angle that subtends each of the partial light-emitting regions from a rotation center of the rotary color filter, and θmin as a minimum angle that subtends each of the partial light-emitting regions from the rotation center of the rotary color filter.

Furthermore, a configuration is possible in which the partial light-emitting regions have respective dimensions adjusted to have approximately the same angle for subtending each of the partial light-emitting regions from a rotation center of the rotary color filter.

Furthermore, preferably, the light-emitting surface has a rectangular shape and is disposed so that a direction of a short side of the light-emitting surface approximately coincides with the rotation direction of the rotary color filter.

In that case, preferably, the light-emitting surface is disposed so that the short side of the light-emitting surface is approximately orthogonal at a center of the short side to a radius direction of the rotary color filter.

Furthermore, preferably, a light-blocking member for blocking undesired light is disposed in a vicinity of the light-emitting surface.

Furthermore, preferably, the rotary color filter is composed of a plurality of color filters arranged in a disk shape, each of the color filters is composed of a vapor-deposited multilayer film that reflects a particular color of light, and the multilayer film is vapor-deposited on a side closer to the light-emitting surface.

Furthermore, preferably, the control device brings one of the partial display regions corresponding to each of the partial light-emitting regions to an OFF state during a time period in which the each of the partial light-emitting regions is opposed to one of the color filters of a color irrelevant to a display color displayed by the special light modulator, and during a time period in which the each of the partial light-emitting regions lies across a boundary line between one of the color filters of a color relevant to the display color and one of the color filters of a color irrelevant to the display color.

Furthermore, preferably, the light-emitting-surface-forming optical elements include a rod integrator with a light incidence end at which a reflection film is provided.

Furthermore, as the light source, an ultrahigh pressure mercury lamp can be used.

Hereinafter, specific embodiments as applied to the projection type display apparatus according to the present invention will be described with reference to the appended drawings.

Embodiment 1

Figure 1:
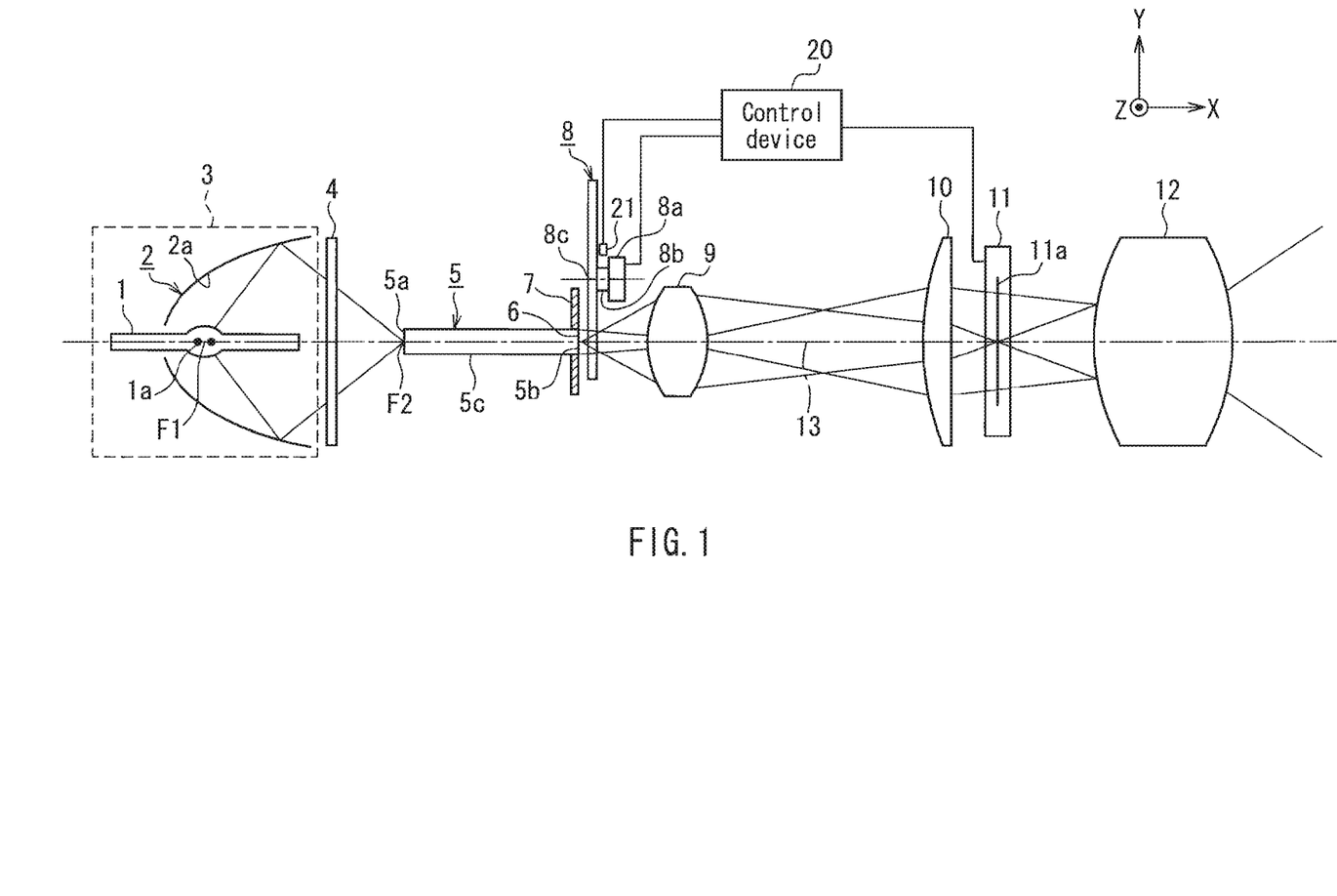
FIG. 1 is a side view showing a configuration of a projection type display apparatus in Embodiment 1 of the present invention.

FIG. 1 is a front view showing a configuration of a projection type display apparatus in Embodiment 1 of the present invention. Herein, where xyz rectangular coordinates are defined as shown in the figure, FIG. 1 shows a configuration taken along an x-z plane.

In FIG. 1, reference numeral 3 denotes a light source that radiates white light, 5 a glass rod as one of light-emitting-surface-forming optical elements, 8 a rotary color filter, 9 a relay lens as an illumination optical element, 11 a transmission type liquid crystal panel as a spatial light modulator, and 12 a projection lens.

The light source 3 is composed of a discharge lamp 1 and an ellipsoidal mirror 2. As the discharge lamp 1, an ultrahigh pressure mercury lamp can be used. An ultrahigh pressure mercury lamp radiates white light and exhibits an extremely high luminance and an excellent light-condensing ability, thereby allowing light to be condensed efficiently by the ellipsoidal mirror 2.

The ellipsoidal mirror 2 has, for example, a first focal (short focal) length F1=10 mm and a second focal (long focal) length F2=100 mm. On a reflection surface 2a of the ellipsoidal mirror 2, for example, a dielectric multilayer film that reflects visible light efficiently and transmits infrared light is formed and efficiently reflects a visible light component of light radiated from the discharge lamp 1 to a desired direction.

The discharge lamp 1 is disposed so that a center of a light-emitting portion formed between a pair of electrodes 1a roughly coincides with a first focal point F1 of the ellipsoidal mirror 2. Thus, a condensed light spot of a size in proportion to the size of the light-emitting portion is formed in the vicinity of a second focal point F2 of the ellipsoidal mirror 2, thereby allowing light radiated from the discharge lamp 1 to be condensed efficiently.

A UV-IR cut-off filter 4 is used to cut off ultraviolet light and infrared light contained in light radiated from the light source 3.

A rod integrator 5 made of glass (hereinafter, referred to as a glass rod) is disposed in the vicinity of the second focal point F2 of the ellipsoidal mirror 2. The glass rod 5 has an incidence end 5a and an emission end 5b that are in a rectangular shape having a size of 5 mm×4 mm, and is disposed so that the incidence end 5a roughly coincides with the second focal point F2 of the ellipsoidal mirror 2. As described above, a condensed light spot is formed in the vicinity of the second focal point F2, thereby allowing light condensed by the ellipsoidal mirror 2 to be incident in the glass rod 5 efficiently.

It is preferable that the glass rod 5 is made of quartz glass that has excellent heat resistance. Light that has entered from the incidence end 5a of the glass rod 5 is reflected totally and repeatedly from a side surface 5c of the glass rod 5 to be diffused and is led to the emission end 5b. As a result of this, a light-emitting surface 6 having a uniform brightness distribution is formed at the emission end 5b of the glass rod 5.

Figure 2:
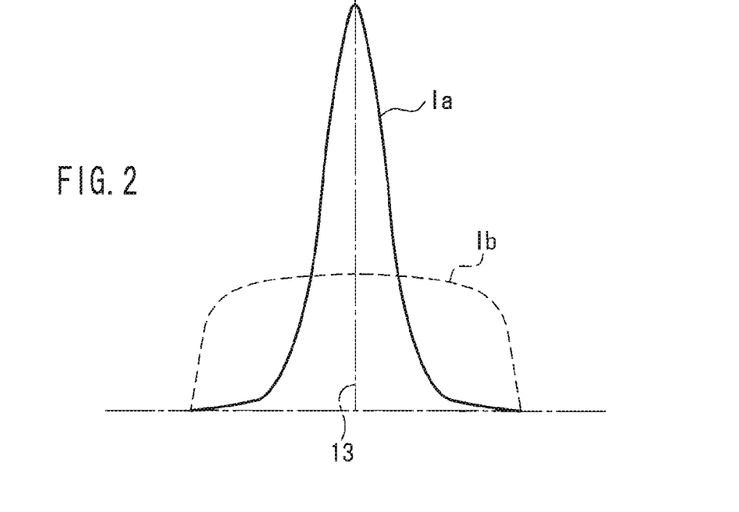
FIG. 2 is a light intensity distribution diagram illustrating an example of light intensity distributions obtained respectively at incidence and emission ends of a glass rod that is a constituent component of the projection type display apparatus.

FIG. 2 is a light intensity distribution diagram showing an example of light intensity distributions obtained respectively at the incidence end 5a and at the emission end 5b of the glass rod 5. In FIG. 2, a light intensity distribution Ia at the incidence end 5a of the glass rod 5 is concentrated in the vicinity of an optical axis 13, while the light intensity distribution Ib at the emission end 5b is approximately uniform from the vicinity of the optical axis 13 to peripheries.

The rotary color filter 8 is disposed in the vicinity of the emission end 5b of the glass rod 5, i.e. in the vicinity of the light-emitting surface 6. A motor 8a is mounted on a rotary shaft 8b of the rotary color filter 8 and rotates the rotary color filter 8 around a rotation center 8c.

The relay lens 9 allows a conjugate relationship to be established between the light-emitting surface 6 and a display surface 11a of the liquid crystal panel 11, and forms illumination light for illuminating the display surface 11a of the liquid crystal panel 11. Upon receiving light transmitted through the liquid crystal panel 11, the projection lens 12 magnifies an image on the display surface 11a of the liquid crystal panel 11, i.e. an optical image and projects it on a screen (not shown) in a magnified state. A field lens 10 is used to lead illumination light for the liquid crystal panel 11 to the projection lens 12.

Figure 3:
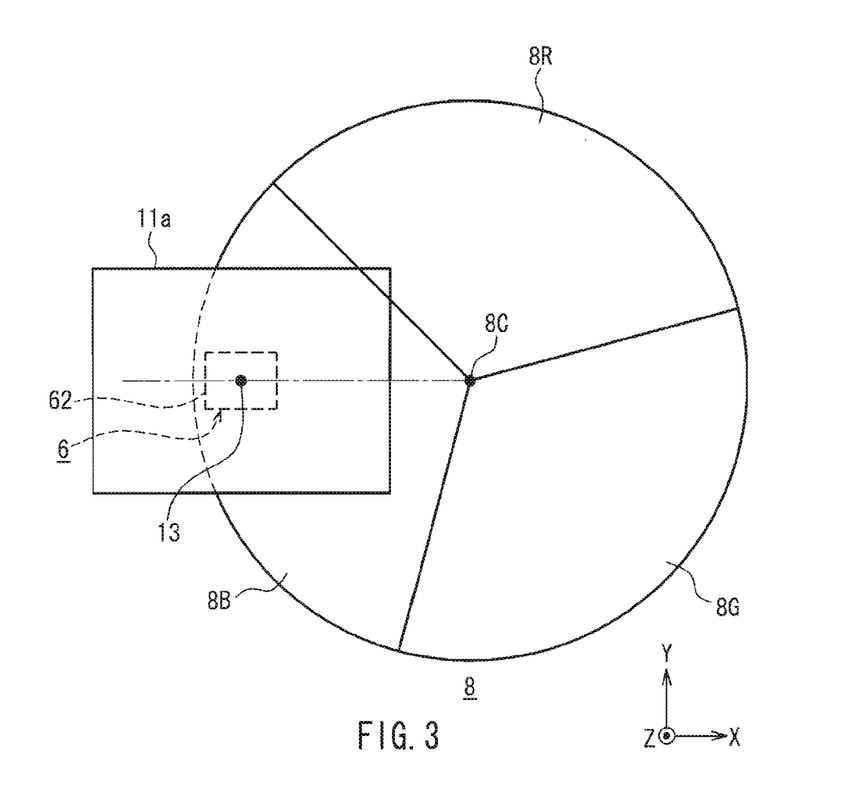
FIG. 3 is a schematic diagram showing a positional relationship among a light-emitting surface, a rotary color filter, and a display surface of a liquid crystal panel, which are constituent components of the projection type display apparatus.

FIG. 3 is a schematic diagram showing a positional relationship among the light-emitting surface 6, the rotary color filter 8, and the display surface 11*a* of the liquid crystal panel 11. The rotary color filter 8 is composed of, for example, a red filter 8R that transmits light of a red component, a green filter 8G that transmits light of a green component, and a blue filter 8B that transmits light of a blue component, which are combined into a disk shape. The emission end 5*b* of the glass rod 5, i.e. the light-emitting surface 6 is geometrically similar to the display surface 11*a* of the liquid crystal panel 11. Further, the light-emitting surface 6 is disposed so that a short side 62 thereof is approximately orthogonal to a line passing through the optical axis 13 and the center of the rotary color filter 8.

The liquid crystal panel 11 is a ferroelectric liquid crystal panel and is a bistable element that is switched between two states that are ON/OFF states. A gradation expression is realized by changing an ON time of the liquid crystal panel 11 by, for example, PWM (pulse width modulation) control. This type of liquid crystal panel has a relatively short response time and thus is suitable for the case of performing a color sequential display. In the liquid crystal panel 11, a polarizing plate (not shown) is provided on each of an incidence side and an emission side, and a polarizing axis of the polarizing plate is set in accordance with an alignment direction of liquid crystal molecules.

A control device 20 controls the liquid crystal panel 11 by PWM (pulse width modulation) control based on a video signal. At the same time, the control device 20 performs driving control with respect to the motor 8*a* for rotation so that a displayed image is in synchronization with a color of light transmitted through the rotary color filter 8. That is, the rotary color filter 8 is rotated so that a time period in which the liquid crystal panel 11 is controlled based on, for example, a video signal for displaying red, is in synchronization with a time period in which the red color filter 8R of the rotary color filter 8 passes over the light-emitting surface 6.

Normally, during a time period in which the liquid crystal panel 11 displays a unit image of, for example, red for forming one frame, the rotary color filter 8 is rotated plural times. Accordingly, during that time period, the red color filter 8R passes over the light-emitting surface 6 plural times. Because of this, in synchronization with passing of the red color filter 8R, the liquid crystal panel 11 is controlled so as to be switched between an image display state where a normal display based on a video signal is performed and an OFF state for cutting off light (so-called black display). The switching operation will be described more specifically later.

This also applies to the cases of displaying green and blue colors. Monochrome gradation displays of red, green and blue are performed in such a manner as to be switched sequentially in a short time period, so that images thereof are combined visually, which are thus recognized as a full-color image by a viewer.

In order to control the rotation of the rotary color filter 8, a rotation phase of the rotary color filter 8 needs to be detected. The rotation phase of the rotary color filter 8 can be detected by, for example, a method in which the rotary shaft 8*b* of the rotary color filter 8 is painted black, a light-reflecting surface is provided on a portion of the rotary shaft 8*b*, and passing of the light-reflecting surface is detected by a photosensor 21 or the like. A detection signal obtained by the photosensor 21 is supplied to the control device 20 and is used to control a display with the liquid crystal panel 11 to be in synchronization with the rotation of the motor 8*a*.

Figure 4A:
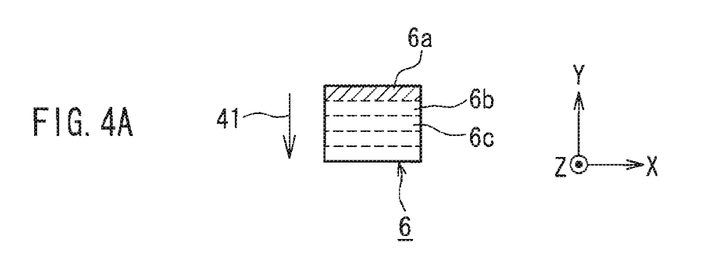
FIG. 4A is a schematic diagram showing an example of how the light-emitting surface is divided in the projection type display apparatus.
Figure 4B:
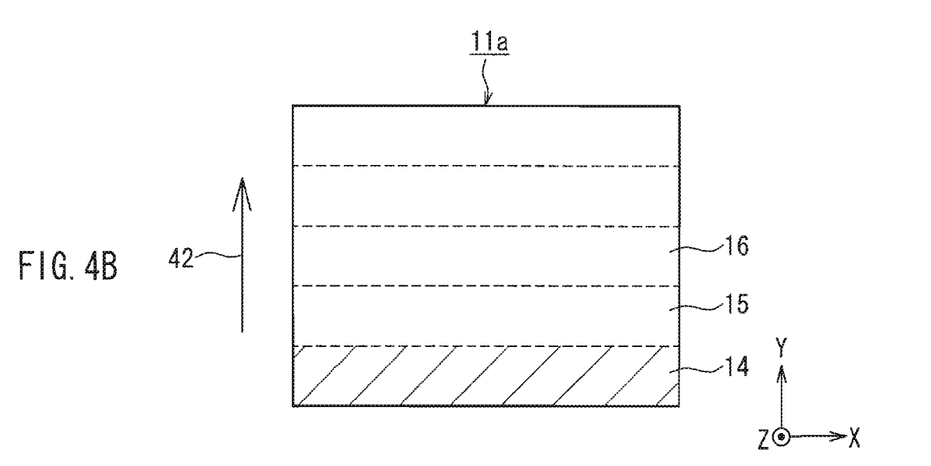
FIG. 4B is a schematic diagram showing an example of how the display surface of the liquid crystal panel is divided in the projection type display apparatus.

As shown in FIGS. 4A and 4B, the emission end 5*b* of the glass rod 5 is set so as to be geometrically similar to the display surface 11*a* of the liquid crystal panel 11. Thus, a light intensity distribution on the light-emitting surface 6 is transferred faithfully to the display surface 11*a*.

In this embodiment, as shown in FIG. 4A, hypothetically, a plurality of partial light-emitting regions 6*a*, 6*b*, 6*c*, . . . are set that are obtained by dividing the light-emitting surface 6 into equal portions. Herein, the term "hypothetically" is used to mean that the division is not performed physically.

Since the light-emitting surface 6 is in a conjugate relationship with the display surface 11*a* of the liquid crystal panel 11, an image of each of the partial light-emitting regions 6*a*, 6*b*, 6*c*, . . . is formed on a corresponding one of partial display regions 14, 15, 16, . . . on the display surface 11*a*. In the liquid crystal panel 11, each of the partial display regions 14, 15, 16, . . . is controlled so as to perform a normal image display or an OFF state display. Switching between an image display state and an OFF state of each of the partial display regions 14, 15, 16, . . . is controlled in accordance with a rotation phase of the rotary color filter 8.

Figure 5:
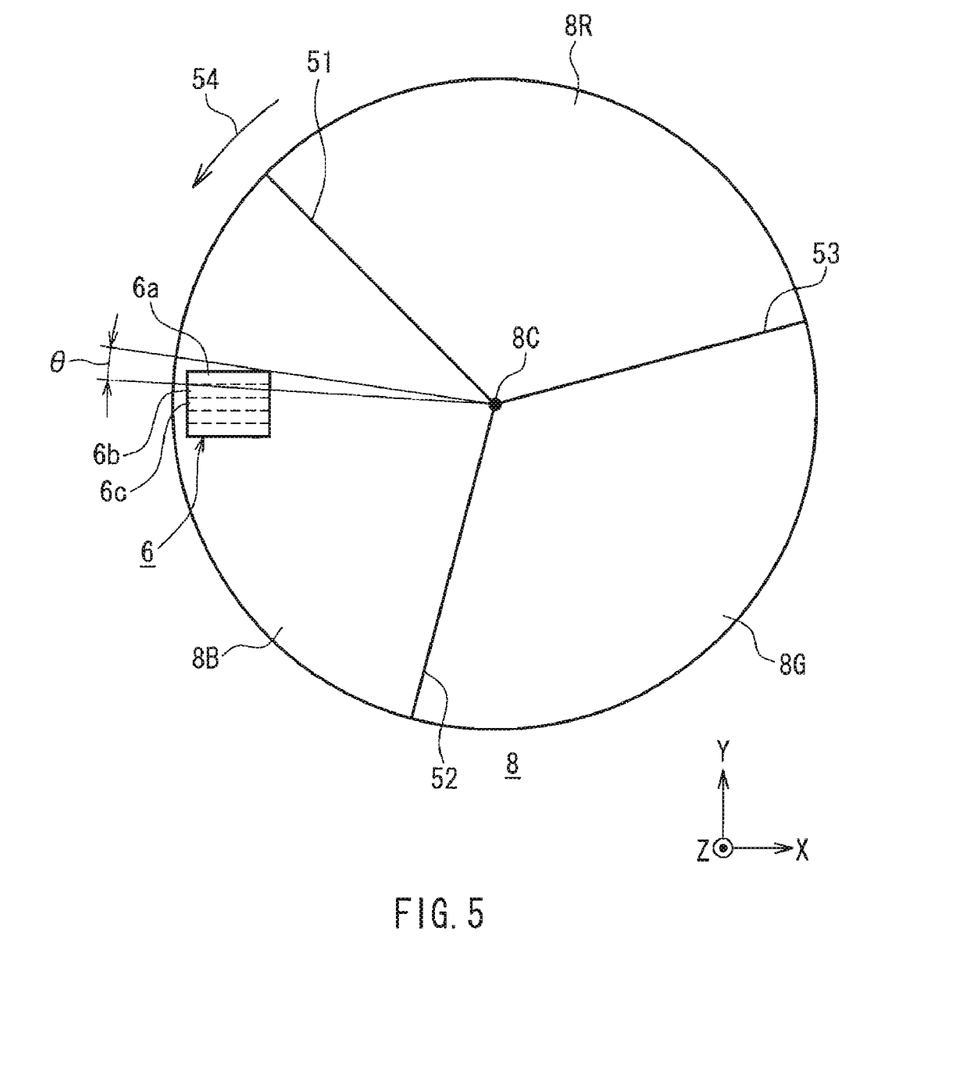
FIG. 5 is a schematic diagram for explaining a positional relationship between and operations of the light-emitting surface and the rotary color filter in the projection type display apparatus.

The following describes a specific configuration, operation and function of the projection type display apparatus according to this embodiment with reference to FIGS. 4A and 4B and FIG. 5.

FIG. 5 is a schematic diagram for explaining a positional relationship between and operations of the light-emitting surface 6 and the rotary color filter 8. As the rotary color filter 8 is rotated in a direction indicated by an arrow 54, boundary lines 51, 52 and 53, which are formed between the color filters 8R and 8B, between the color filters 8B and 8G, and between the color filters 8G and 8R, respectively, sequentially pass over the light-emitting surface 6.

The light-emitting surface 6 is assumed to be divided in a direction in which the boundary lines 51, 52 and 53 between each pair of adjacent ones of the color filters 8R, 8G and 8B pass, i.e. in a direction indicated by an arrow 41 in FIG. 4A. As shown in FIG. 4B, on the display surface 11*a* of the liquid crystal panel 11, the boundary lines 51, 52 and 53 between each pair of adjacent ones of the color filters 8R, 8G and 8B of the rotary color filter 8 pass in a direction indicated by an arrow 42.

As the rotary color filter 8 is rotated, the partial display regions 14, 15, 16, . . . of the liquid crystal panel 11 perform the following display operation.

When each of the color filters 8R, 8G and 8B passes over the light-emitting surface 6 as shown in FIG. 5, during a time period in which, for example, the partial light-emitting region 6*a* is opposed to a color filter of a color irrelevant to a display color displayed by the liquid crystal panel 11, the partial display region 14 that is conjugate to the partial light-emitting region 6*a* is controlled so as to be in an OFF state. Moreover, also during a time period in which the partial light-emitting region 6*a* lies across a boundary line between a color filter of a color relevant to the display color and a color filter of a color irrelevant to the display color, the partial display region 14 that is conjugate to the partial light-emitting region 6*a* is controlled so as to be in the OFF state. This also applies to the other partial light-emitting regions 6*b*, 6*c*, . . . and the partial display regions 15, 16, . . . that are conjugate thereto.

Specifically, for example, in the case of displaying red (single color), during a time period in which each of the partial light-emitting regions 6*a*, 6*b*, 6*c*, . . . is opposed to the green and blue filters and during a predetermined time period in which the each of the light-emitting regions 6*a*, 6*b*, 6*c*, . . . lies across each of the boundary line 51 between blue and red and the boundary line 53 between green and red, one of the partial display regions 14, 15, 16, . . . on the liquid crystal panel 11 that is conjugate to the each of the partial light-emitting regions 6a, 6b, 6c, . . . is controlled so as to be in the OFF state. This also applies to the cases of displaying green and blue.

On the other hand, in the case of displaying yellow (mixed color), the following operation may be applied. That is, during a time period in which each of the partial light-emitting regions is opposed to the blue filter and during a predetermined time period in which the each of the partial light-emitting regions lies across each of the boundary line 51 between red and blue and the boundary line 52 between green and blue, one of the display regions that is conjugate to the each of the partial light-emitting regions is controlled so as to be in the OFF state.

As described above, the control of an OFF state is performed with respect to each of the partial display regions 14, 15, 16, . . . , and thus compared with the case where the entire display surface 11a is controlled to be in an OFF state at the same time, light is transmitted for a longer period of time, thereby improving the efficiency of using illumination light. Thus, it is possible to achieve an increased color luminance, while sufficiently maintaining the effect of preventing color mixing from being caused by adjoining color filters.

In this embodiment, it is desirable that an OFF display period of each of the partial display regions 14, 15, 16, . . . be controlled as follows. That is, with respect to the partial light-emitting regions 6a, 6b, 6c, . . . obtained by division into a plurality of portions as shown in FIG. 5, an angle θ (variable) is defined as an angle that subtends each of the partial light-emitting regions from the rotation center 8c of the rotary color filter 8. Where a maximum value of the angle θ, i.e. a maximum angle is indicated as θmax, dimensions of the divided partial light-emitting regions 6a, 6b, 6c, . . . are set so as to satisfy an expression (1) below.

$$\theta max \leq 8 \text{ deg} \quad (1)$$

Then, only during a time period corresponding to θmax, a corresponding one of the partial display regions 14, 15, 16, . . . on the display surface 11a of the liquid crystal panel 11 is brought to the OFF state.

In the case where θmax is set to a value exceeding the upper limit in the above expression, a black display period becomes too long, causing a significant loss, so that sufficient brightness of a displayed image hardly can be obtained.

It is more effective that at the same time, where a minimum value of the angle θ, i.e. a minimum angle is indicated as θmin, dimensions of the divided partial light-emitting regions 6a, 6b, 6c, . . . are set so as to satisfy an expression (2) below.

$$\theta max/\theta min \leq 5 \quad (2)$$

In the case where θmax and θmin are set so that a resulting value exceeds the upper limit value in the above expression, with respect to the partial light-emitting region of the minimum angle, a black display period for the partial display region corresponding thereto is set so as to be too long, resulting in a uselessly long black display period. Even when the requirement of the expression (2) is used alone without being combined with the requirement of the expression (1), an adequate effect can be obtained.

Furthermore, a light-blocking plate 7 for blocking undesired light is disposed in the vicinity of the light-emitting surface 6, and thus it is possible to prevent undesired light from reaching the display surface 11a of the liquid crystal panel 11, thereby suppressing a temperature rise of the liquid crystal panel 11. At the same time, black floating caused by undesired light is suppressed, thereby providing an improved contrast.

Since the light-emitting surface 6 is in roughly a conjugate relationship with the display surface 11a of the liquid crystal panel 11, the farther the rotary color filter 8 is placed away from the light-emitting surface 6, the more a boundary line between each pair of adjacent ones of the color filters 8G, 8G and 8B blurs on the display surface 11a of the liquid crystal panel 11. As a result of this, a black display period required for suppressing color mixing becomes longer, leading to a deterioration in brightness.

Therefore, it is preferable that the rotary color filter 8 is disposed as closely as possible to the light-emitting surface 6, and it is practically preferable that the rotary color filter 8 is at a distance of not more than 5 mm from the light-emitting surface 6.

Furthermore, for a reason similar to the above-described reason, it is preferable that each of the color filters 8R, 8G and 8B of the rotary color filter 8 is a dichroic mirror composed of a vapor-deposited multilayer film, and the multilayer film is provided on a surface on a side closer to the light-emitting surface 6.

By the above-described configuration in which a light-emitting surface is divided hypothetically into a plurality of partial light-emitting regions, and an angle that subtends each of the partial light-emitting regions from a rotation center of a rotary color filter is set appropriately, the length of a black display period is suppressed, thereby achieving a sufficiently increased color luminance.

Embodiment 2

Figure 6A:
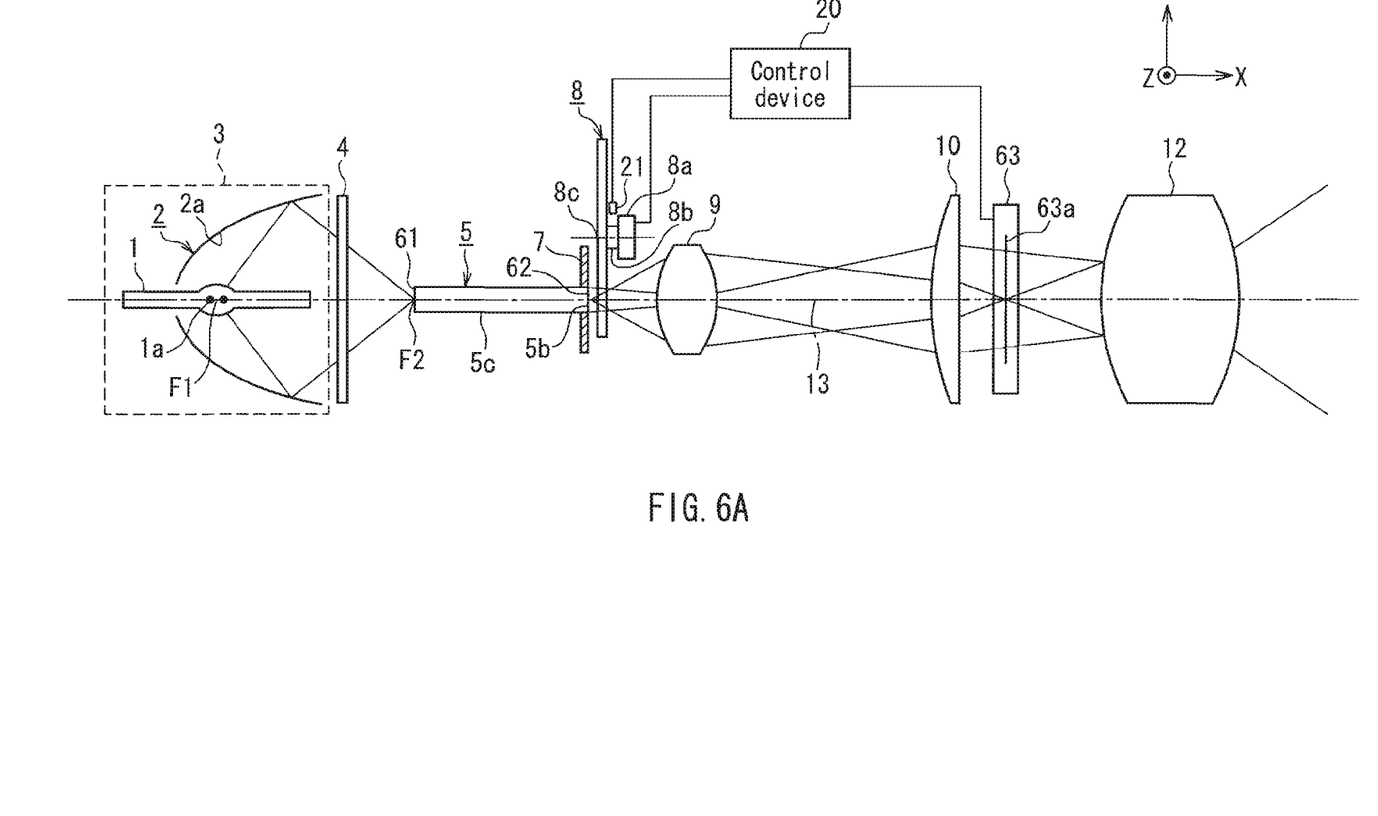
FIG. 6A is a side view showing a configuration of a projection type display apparatus in Embodiment 2 of the present invention.

FIG. 6A is a side view showing a configuration of a projection type display apparatus in Embodiment 2 of the present invention. In the figure, the same reference characters indicate components similar to the components in the apparatus in Embodiment 1 shown in FIG. 1, and duplicate descriptions thereof are omitted.

The projection type display apparatus according to this embodiment has the same configuration as that of the apparatus according to Embodiment 1 shown in, for example, FIG. 1 except that a reflection film 61 is provided at an incidence end of a glass rod 5, and a light-emitting surface 62 and a display surface 63a of a liquid crystal panel 63 are divided differently from the case of Embodiment 1.

Figure 6B:
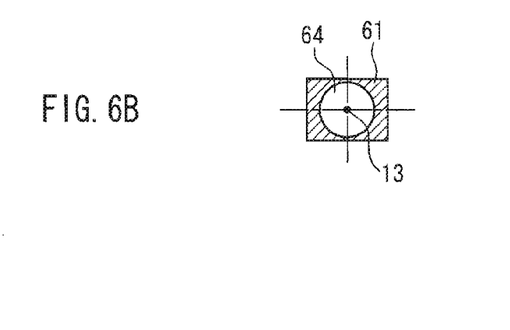
FIG. 6B is an enlarged front view showing a portion of the projection type display apparatus.

The reflection film 61 is a multilayer film provided on an incidence end surface of a rod integrator 5. An enlarged view shown in FIG. 6B is a schematic view of the incidence end surface of the rod integrator 5 as seen from a direction of an optical axis 13. The reflection film 61 is provided in an area other than an opening 64.

Light condensed by an ellipsoidal mirror 2 passes through the opening 64 to reach an emission end surface 5b of the rod integrator 5. Light emitted from the emission end surface 5b is incident on a rotary color filter 8 through which light with wavelengths in predetermined wavelength bands is transmitted. Light other than the transmitted light, on the other hand, is reflected and mostly is incident again on the emission end surface 5b of the rod integrator 5 to reach the incidence end surface. At the incidence end surface of the rod integrator 5, part of the light that has been reflected from the rotary color filter 8 and reached the incidence end surface again is reflected again by the reflection film 61 to a direction of the emission end surface 5b.

Thus, light that has been reflected from the rotary color filter 8 can be made incident again on the rotary color filter 8.

As a result of this, in the case where two different color filters on the rotary color filter 8 pass over the emission end surface 5b of the rod integrator 5, light reflected from the color filters can be used effectively.

Figure 7A:
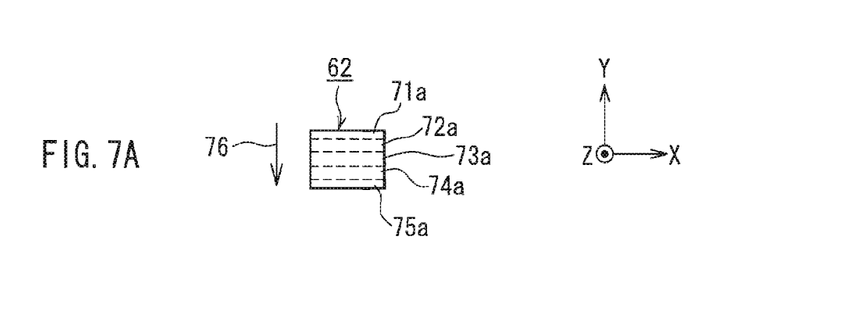
FIG. 7A is a schematic diagram showing an example of how a light-emitting surface is divided in the projection type display apparatus.
Figure 7B:
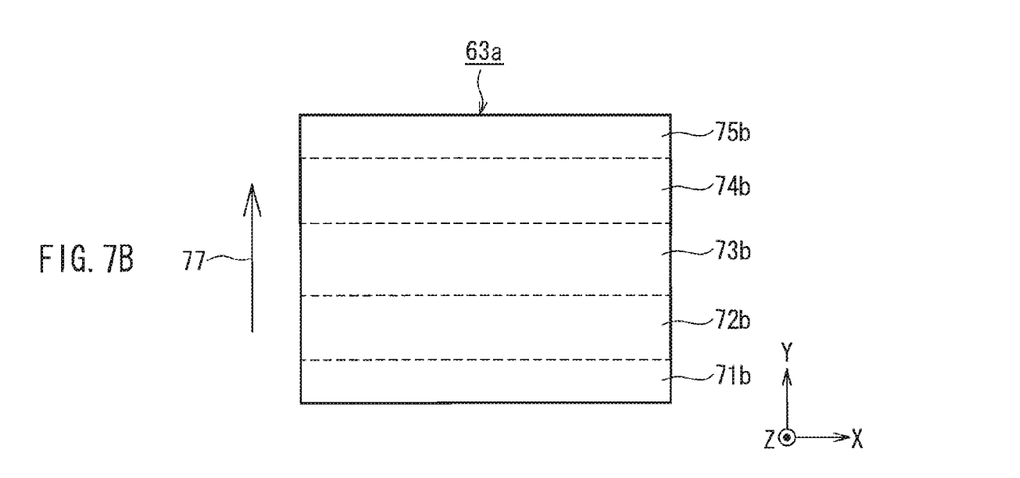
FIG. 7B is a schematic diagram showing an example of how a display surface of a liquid crystal panel is divided in the projection type display apparatus.
Figure 8:
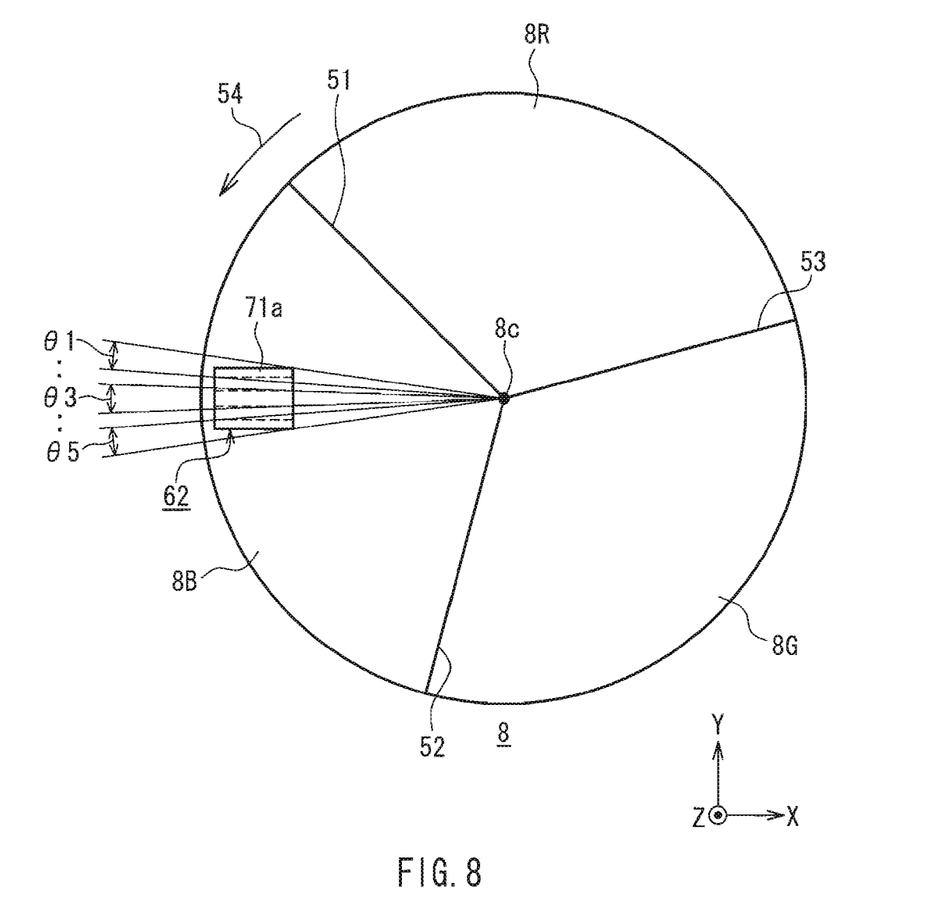
FIG. 8 is a schematic diagram for explaining a positional relationship between and operations of the light-emitting surface and a rotary color filter.

The following describes a function according to this embodiment with reference to FIGS. 7A and 7B and FIG. 8. FIG. 7A is a schematic diagram showing an example of how the light-emitting surface 62 is divided in this embodiment. FIG. 7B is a schematic diagram showing an example of how the display surface 63a of the liquid crystal panel 63 is divided.

As shown in FIG. 7A, the light-emitting surface 62 is divided into a plurality of partial light-emitting regions 71a, 72a, 73a, 74a, and 75a in a direction indicated by an arrow 76 in which a boundary line between each pair of adjacent ones of the color filters of the rotary color filter 8 passes. Meanwhile, as shown in FIG. 7B, portions of the display surface 63a on the liquid crystal panel 63 that correspond respectively to these partial light-emitting regions are defined to be partial display regions 71b, 72b, 73b, 74b, and 75b, respectively.

The respective dimensions of the partial light-emitting regions in a division direction (direction indicated by the arrow 76) are set so that the partial light-emitting regions 71a and 75a have substantially the same dimension, the partial light-emitting regions 72a and 74a have substantially the same dimension, and (the dimension of the partial light-emitting region 71a)<(the dimension of the partial light-emitting region 72a)<(the dimension of the partial light-emitting region 73a) is satisfied. The respective dimensions of the partial display regions 71b, 72b, 73b, 74b, and 75b on the display surface 63a of the liquid crystal panel 63, which is conjugate to the light-emitting surface 62, are set in a similar manner. That is, the respective dimensions of the partial display regions are set so that in the division direction, the partial display regions 71b and 75b have substantially the same dimension, the partial display regions 72a and 74b have substantially the same dimension, and (the dimension of the partial display region 71b)<(the dimension of the partial display region 72b)<(the dimension of the partial display region 73b) is satisfied.

FIG. 8 is a schematic diagram for explaining a positional relationship between the light-emitting surface 62 and the rotary color filter 8 and an operation of the projection type display apparatus according to this embodiment.

Herein, an angle θ1 is defined as an angle that subtends the partial light-emitting region 71a from the rotation center 8c of the rotary color filter 8. Similarly, angles θ2, θ3, θ4, and θ5 are defined as angles that subtend the partial light-emitting regions 72a, 73a, 74a, and 75a, respectively. The respective dimensions of the partial light-emitting regions 71a, 72a, 73a, 74a, and 75a are set so that a relationship θ1=θ2=θ3=θ4=θ5 is satisfied.

Accordingly, time periods in which boundary lines between each pair of adjacent ones of the color filters pass over the partial light-emitting regions, respectively, become equal. Thus, a black display period for preventing the occurrence of color mixing can be set to a required minimum length of time. As a result of this, the efficiency of using illumination light for illuminating the liquid crystal panel 63 can be increased.

By the above-described configuration according to this embodiment, in which angles that respectively subtend partial light-emitting regions from a rotation center of a rotary color filter are set so as to be roughly equal, the occurrence of color mixing due to a deterioration of a light source is suppressed even by a black display period set to a required minimum length of time, thereby allowing an image to be displayed with a high color luminance.

Although Embodiments 1 and 2 described above showed the case where a transmission type liquid crystal panel was used as a spatial light modulator, a reflection type spatial light modulator such as a DMD also may be used.

Furthermore, although the foregoing description was directed to the case where a rod integrator made of glass was used as one of light-emitting-surface-forming optical elements, the case of using a rod integrator formed of mirrors attached together so as to form a pipe shape or the case of using two lens arrays also can provide a similar effect.

Furthermore, although the foregoing description was directed to the case where a rotary color filter was divided into three filters that were a red filter, a green filter and a blue filter, the number of color filters obtained by division and wavelength bands of light transmitted through the color filters are not limited to the above-described embodiments.

INDUSTRIAL APPLICABILITY

According to the present invention, the efficiency of using illumination light by a spatial light modulator is improved, and it is possible to achieve an increased color luminance of a projected image, while sufficiently maintaining an effect of preventing color mixing from being caused by adjoining color filters. Thus, the present invention is highly useful in realizing a projection type display apparatus that projects a large screen video image on a screen.

The invention claimed is:

1. A projection display apparatus, comprising:
a light source that radiates white light;
light-emitting-surface-forming optical elements that condense light emitted from the light source so as to form a light-emitting surface;
a rotary color filter that is disposed in a vicinity of the light-emitting surface and has plural types of color filters for selectively transmitting or reflecting, in a predetermined order, particular colors of light of white light emitted from the light-emitting surface;
a spatial light modulator that is disposed so as to be in substantially a conjugate relationship with the light-emitting surface, and modulates incident light in accordance with a video signal, so as to display an image;
an illumination optical element that condenses light emitted from the rotary color filter to form illumination light for illuminating the spatial light modulator;
a projection lens that projects an image formed by the spatial light modulator; and
a control device that controls rotation of the rotary color filter so as to be in synchronization with the image display by the spatial light modulator,
wherein the control device performs divisional driving for switching a state of displaying an image with respect to each of a plurality of partial display regions of the spatial light modulator that correspond respectively to a plurality of partial light-emitting regions defined by dividing the light-emitting surface in a rotation direction of the rotary color filter, so that each of the partial display regions is switched between a normal image display state and an OFF state for cutting off light, in synchronization with passing of a boundary line between each pair of adjacent ones of the color filters of the rotary color filter over each of the partial light-emitting regions.

2. The projection display apparatus according to claim 1, wherein the partial light-emitting regions are set so as to have a dimension that satisfies an expression below:

$$\theta max \leq 8 \text{ deg}$$

where $\theta max$ is defined as a maximum angle that subtends each of the partial light-emitting regions from a rotation center of the rotary color filter.

3. The projection display apparatus according to claim 1, wherein the partial light-emitting regions are set so as to have a dimension that satisfies an expression below:

$$\theta max/\theta min \leq 5$$

where $\theta max$ is defined as a maximum angle that subtends each of the partial light-emitting regions from a rotation center of the rotary color filter, and $\theta min$ as a minimum angle that subtends each of the partial light-emitting regions from the rotation center of the rotary color filter.

4. The projection display apparatus according to claim 1, wherein the partial light-emitting regions have respective dimensions adjusted to have approximately the same angle for subtending each of the partial light-emitting regions from a rotation center of the rotary color filter.

5. The projection display apparatus according to claim 1, wherein the light-emitting surface has a rectangular shape and is disposed so that a direction of a short side of the light-emitting surface approximately coincides with the rotation direction of the rotary color filter.

6. The projection display apparatus according to claim 5, wherein the light-emitting surface is disposed so that the short side of the light-emitting surface is approximately orthogonal at a center of the short side to a radius direction of the rotary color filter.

7. The projection display apparatus according to claim 1, wherein a light-blocking member for blocking undesired light is disposed in a vicinity of the light-emitting surface.

8. The projection display apparatus according to claim 1, wherein the rotary color filter is composed of a plurality of color filters arranged in a disk shape, each of the color filters is composed of a vapor-deposited multilayer film that reflects a particular color of light, and the multilayer film is vapor-deposited on a side closer to the light-emitting surface.

9. The projection display apparatus according to claim 1, wherein the control device brings one of the partial display regions corresponding to each of the partial light-emitting regions to an OFF state during a time period in which the each of the partial light-emitting regions is opposed to one of the color filters of a color irrelevant to a display color displayed by the special light modulator, and during a time period in which the each of the partial light-emitting regions lies across a boundary line between one of the color filters of a color relevant to the display color and one of the color filters of a color irrelevant to the display color.

10. The projection display apparatus according to claim 1, wherein the light-emitting-surface-forming optical elements include a rod integrator with a light incidence end at which a reflection film is provided.

11. The projection display apparatus according to claim 1, wherein the light source is an ultrahigh pressure mercury lamp.

* * * * *